United States Patent [19]

Pokhodnya et al.

[11] 4,317,688
[45] Mar. 2, 1982

[54] FLUX COMPOSITION FOR FLUX-CORED WIRE

[76] Inventors: Igor K. Pokhodnya, ulitsa Chkalova, 41a, kv. 25; Vladimir N. Golovko, ulitsa Vladimirskaya, 9, kv. 29, both of Kiev, U.S.S.R.

[21] Appl. No.: 167,228

[22] Filed: Jul. 9, 1980

[51] Int. Cl.$^3$ .............................................. B23K 35/34
[52] U.S. Cl. ......................................... 148/24; 148/26
[58] Field of Search ................................... 148/24, 26

[56] References Cited

U.S. PATENT DOCUMENTS

| | | | |
|---|---|---|---|
| 3,201,292 | 8/1965 | Miltschitzky | 148/26 |
| 3,272,667 | 9/1966 | Siegle | 148/26 |
| 3,424,626 | 1/1969 | Coless | 148/26 |
| 3,733,458 | 5/1973 | Pokhodnya et al. | |
| 3,935,414 | 1/1976 | Ballass | 148/24 |
| 4,207,121 | 6/1980 | Nakabayashi | 148/26 |

FOREIGN PATENT DOCUMENTS 858854  3/1957  United Kingdom .

*Primary Examiner*—P. D. Rosenberg
*Attorney, Agent, or Firm*—Fleit & Jacobson

[57] ABSTRACT

Core flux composition of a flux-cored wire for welding and surfacing steels with a gas-shielded process contains the core flux ingredients in the following amounts, by weight %:

| | |
|---|---|
| rutile concentrate | 20–40 |
| fluorite concentrate | 0.6–8.5 |
| ferromanganese | 13.5–18.5 |
| ferrosilicon | 1.6–2.7 |
| nepheline concentrate | 0.5–7 |
| cryolite | 0.6–4.5 |
| iron powder | balance |

4 Claims, No Drawings

FLUX COMPOSITION FOR FLUX-CORED WIRE

BACKGROUND OF THE INVENTION

1. Field of the Invention

The present invention relates to materials for arc welding, and in particular to a flux composition of flux-cored wires for welding steels with a gas-shielded process.

The invention may be used more efficiently in the flux-cored wires designed for automatic and semiautomatic welding in normal, inclined and horizontal positions of the weld seam in a vertical plane.

2. Prior art

Known in the art are flux compositions for flux-cored wires with a lime-type coating designed for welding and surfacing steels with $CO_2$-shielded process in all positions, and comprising a steel sheath filled with a powdered flux forming a core thereof. It is worth noting that the best results have been obtained by using a flux-cored wire having a flux core containing the following ingredients, by weight %:

| | |
|---|---|
| rutile concentrate | 31 |
| fluorite concentrate | 16 |
| ferromanganese | 9 |
| ferrosilicon | 2 |
| iron powder | 42 |
| (cf. British Patent No. 858,854) | |

The flux-cored wire having a flux core formed from the above flux composition provides for the formation of a refined weld metal with a small amount of non-metallic inclusions and a low oxygen content. The weld joint thus produced features a high plasticity and notch impact toughness at low temperatures. However, this flux composition contains a great amount of the fluorite concentrate which is introduced therein to prevent hydrogen from dissolving in the weld metal. The high content of the fluorite concentrate is accounted for by its low intensity of binding hydrogen which is present in high amounts in the arc zone, thereby causing formation of pores in the weld metal. Since the fluorite concentrate contains 90% by weight of calcium fluoride ($CaF_2$) which is known to destabilize arcing, the welding with the use of the above flux-cored wire is accompanied with an intensive spattering of electrode metal.

It is to be noted that welding apparatus operating with alternating loads not always meet conditions of the weld joint formation. In addition, the resulting weld joints have coarse ripples and a bead shape, which lowers their fatigue strength. To improve the latter the resultant weld has to be machined which is associated with additional labour consumption.

The are also known flux compositions for flux-cored wires of the rutile type designed for welding and surfacing steels under $CO_2$ in different weld positions. The best results in welding have been obtained with the use of the flux-cored wire having a core formed from the flux composition composed of the following ingredients, weight %:

| | |
|---|---|
| rutile concentrate | 18–38 |
| feldspar | 0.6–5 |
| sodium fluosilicate | 0.6–5.2 |
| ferromanganese | 9.5–12.5 |
| ferrosilicon | 0.6–1.5 |
| iron powder | balance |

(cf. USSR Author's Certificate No. 285,801)

The presence of sodium fluosilicate in the above flux composition provides for more active binding of hydrogen which is present in a great amount in the arc zone, sodium fluosilicate not greatly influencing spattering of electrode material. The flux-cored wires having a core formed from the above flux composition provide for a proper formation of the weld seam: the weld seam is formed slightly concaved with a smooth transition to the basic metal. However, the use of sodium fluosilicate which is highly toxic requires additional safety measures in manufacturing flux-cored wires having a core formed from the above flux composition. In addition, welding slag in the case of using the above flux-cored wires has a low basicity, which is responsible for that the resulting weld metal has a relatively higher content of oxygen (0.08 weight %) in the form of oxide non-metallic inclusions, which lowers resistance of the weld joint to the formation of hot cracks and shifts the threshold of its cold shortness to the range of high temperatures.

The principal object of the invention is the provision of a welding flux composition of flux-cored wires for welding and surfacing steels with a gas-shielded process, which would improve welding properties of the flux-cored wires and safety of the production thereof as well as raise mechanical properties of the weld joint in the wide range of temperatures.

Another object of the invention is to improve the stability of arc.

Still another object of the invention is to minimize the oxygen and hydrogen content in the weld metal.

Yet another object of the invention is to produce a weld joint without pores.

A further object of the invention is to minimize the amount of non-metallic inclusions in the weld metal.

Other objects and advantages of the invention will become evident from the following description of specific embodiments thereof.

SUMMARY OF THE INVENTION

These and other objects of the invention are attained in that a core flux composition of a flux-cored wire for welding and surfacing steels with a gas-shielded process, containing rutile concentrate, ferromanganese, ferrosilicon and iron, according to the invention further contains nepheline concentrate, fluorite concentrate and cryolite, with the all ingredients being taken in the following amounts, by weight %:

| | |
|---|---|
| rutile concentrate | 20–40 |
| fluorite concentrate | 0.6–8.5 |
| ferromanganese | 13.5–18.5 |
| ferrosilicon | 1.6–2.7 |
| nepheline concentrate | 0.5–7 |
| cryolite | 0.6–4.5 |
| iron powder | balance |

The flux-cored wires having a core formed from the proposed flux composition feature good welding properties and provide for a high efficiency of welding and surfacing in downhand, inclined and horizontal welding positions in a vertical plane. They also ensure a proper formation of the weld seam, and high mechanical properties thereof including resistance to hot cracks, and a low content of gases (oxygen, nitrogen and hydrogen).

The presence in the proposed flux composition of the nepheline concentrate containing more than 15% by weight of sodium and potassium oxides provides for a high stability of arcing since the said oxides are good arc stabilizers.

It has been established that decreasing the nepheline concentrate below the said lower limit affects the stability of arc, and leads to intensive spattering of the electrode metal. On the contrary, increasing the nepheline concentrate content above the said upper limit brings about increased viscosity of the resulting slag and lowers its refining capacity, thereby affecting welding properties thereof. In addition, the rate of melting of the core flux is behind that of the steel sheath which results in a higher content in the weld metal of non-metallic inclusions in the form of unfused particles of the core flux, thereby worsening properties of the weld metal.

During welding, a great amount of hydrogen is present in the arc zone, which hydrogen is known to dissolve in metal at high temperatures and evolve therefrom during cristallization thereof. Due to the fact that the rate of evolving of hydrogen is a rather low one there remains a great amount of hydrogen in the weld metal, which lowers the mechanical properties of the latter. Hydrogen dissolving in the weld metal, which favours formation of pores therein, is prevented by the introduction of cryolite in the said amounts. The presence of cryolite in the core flux composition improves the safety of the production of flux-cored wires, since cryolite, unlike sodium fluosilicate, is not toxical. Introducing cryolite into the proposed flux composition in amounts below the lower recommended limits does not bring about tangible results, whereas the cryolite content exceeding the upper recommended limits affects the stability of arc and leads, as a result, to intensive spattering of the electrode metal.

DETAILED DESCRIPTION OF THE INVENTION

The invention will now be explained in greater detail in terms of specific embodiments thereof.

EXAMPLE 1

Welding steel test pieces were effected with the use of 2.5 mm flux-cored wires (designated as A and B) having a core formed from the proposed flux composition of the invention. The steel sheath of each wire cinstituted 70% by weight of the electrode wire used and contained the following ingredients, wgt%: carbon—0.05, manganese—0.20, silicon—traces, phosphorus 0.010, sulphur—0.010.

Forming the weld seams was carried out in a normal inclined position with a semiautomatic process using 400—450 amp d.c. current of reversed polarity, and welding arc voltage of 30-32 v.

Carbon dioxide was used as a shielding gas.

The steel in the test pieces 20 mm thick contained 0.18% of carbon, 0.45% of manganese, 0.20% of silicon, 0.020% of sulphur, 0.015% of phosphorus, the balance being iron.

The core flux composition used contained the following ingredients, in weight %:

TABLE 1

| Core flux ingredients | Flux-cored wire A | B |
|---|---|---|
| rutile concentrate | 20 | 28 |
| fluorite concentrate | 0.6 | 3.2 |
| ferromanganese | 13.5 | 15.0 |
| ferrosilicon | 1.6 | 2.0 |
| nepheline concentrate | 0.5 | 3.4 |
| cryolite | 0.6 | 3.3 |
| iron powder | balance | balance |

Metal of the weld seams formed with the use of the flux-cored wires having a core made from the above flux composition was tested for notch impact strength, specific elongation and tensile strength, and was subjected to physicochemical analysis to determine gas content (oxygen, nitrogen, hydrogen) in the weld metal.

Mechanical tests were conducted by applying conventional methods.

Oxygen, nitrogen and residual hydrogen content was found by conventional vacuum melting methods, whereas the content of diffusive hydrogen was determined by the international standard 180 3690.

The comparative results of mechanical tests and chemical analysis given in tables 2 and 3 illustrate the advantages of the flux-cored wires having a core formed from the proposed flux composition over the prior art flux-cored wire (USSR Author's Certificate No. 285,801).

TABLE 2

| Flux-cored wire | Tensile strength, kg/mm$^2$ | Specific elongation, %% | Notch impact strength, kgm/cm$^2$ (Mesnager notch test) | | | |
|---|---|---|---|---|---|---|
| | | | +20° C. | −20° C. | −40° C. | −60° C. |
| A | 54–55 | 26–28 | 16–18 | 13–14 | 12–13 | 11–12 |
| B | 56–58 | 27–29 | 16–18 | 11–13 | 11–12 | 10–11 |
| Prior art (USSR Author's Cert. 285,801) | 42–46 | 18–22 | 11–12 | 6–7 | 2.5–3.0 | — |

TABLE 3

| flux-cored wire | Gas content, wgt % | | Hydrogen content, cm$^3$ per 100 g | | |
|---|---|---|---|---|---|
| | Oxygen | Nitrogen | diffusive | residual | total |
| A | 0.06 | 0.007 | 2.8 | 2.2 | 5.0 |
| C | 0.07 | 0.010 | 4.0 | 3.0 | 7.0 |
| Prior art (USSR Author's Cert. 285,801) | 0.08 | 0.012 | 4.0 | 4.0 | 8.0 |

As can be seen from Table 2 the weld metal resulting from welding with the use of flux-cored wires A and B features better mechanical properties than the metal of the weld produced by using the prior art wire (USSR Author's Certificate No. 285,801).

In addition, the flux-cored wires having a core formed from the flux composition of the invention provide for a better formation of the weld seam.

EXAMPLE 2

Welding steel test pieces were effected with the use of 2.5 mm flux-cored wires (designated as A and B) having a core formed from the proposed flux composition of the invention. The steel sheath of each wire constituted 70% by weight of the electrode wire used and contained the following ingredients, wgt%: carbon—0.08, manganese—0.30, silicon—0.12, phosphorus 0.030, sulphur—0.030.

Forming the weld seams was carried out in a normal position with a semiautomatic process using 400–450 amp, d.c. current of reversed polarity and welding arc voltage of 30–32 v.

The mixture of oxygen and carbon dioxide taken in the proportion (by weight) 0.3 to 0.7 was used as a shielding gas.

The steel in the test pieces 20 mm thick contained 0.18% of carbon, 0.45% of manganese, 0.20% of silicon, 0.020% of sulphur, 0.015% of phosphorus, the balance being iron.

The core flux composition used contained the following ingredients, in weight %:

| | |
|---|---|
| rutile concentrate | 36 |
| fluorite concentrate | 5.8 |
| ferromanganese | 17.0 |
| ferrosilicon | 2.5 |
| nepheline concentrate | 6.3 |
| cryolite | 4.5 |
| iron powder | balance |

Metal of the weld seams formed with the use of the flux-cored wires having a core made from the above flux composition was tested for notch impact strength, specific elongation and tensile strength, and was subjected to physicochemical analysis to determine gas content (oxygen, nitrogen, hydrogen) in the weld metal.

Mechanical tests were conducted by applying conventional methods.

Oxygen, nitrogen and residual hydrogen content was found by conventional vacuum melting methods, whereas the content of diffusive hydrogen was determined by the international standard ISO 3690.

The test results are given below:

| | |
|---|---|
| Tensile strength, kg/mm$^2$ | 58–62 |
| Specific elongation, % | 26–28 |
| Notch impact strength (Mesnager notch test) kgm/cm$^2$ | |
| +20° C. | 13–14 |
| −20° C. | 9–10 |
| −40° C. | 8–9 |
| −60° C. | 6–7 |
| Oxygen, wgt % | 0.05 |
| Nitrogen, wgt % | 0.008 |
| Diffusive hydrogen, cm$^3$/100 g | 3.2 |
| Residual hydrogen, cm$^3$/100 g | 2.8 |
| Hydrogen, total in cm$^3$/100 g | 6.0 |

In addition, the flux-cored wires having a core formed from the flux composition of the invention provide for a better formation of the weld seams.

EXAMPLE 3

Welding steel test pieces was effected with the use of 2.5 mm flux-cored wires (designated as A and B) having a core formed of the proposed flux composition of the invention. The steel sheath of each wire constituted 70% by weight of the electrode wire used and contained the following ingredients, wgt %: carbon—0.06, manganese—0.30, silicon—0.10, phosphorus—0.010, sulphur—0.010.

Forming the weld seams was carried out in a vertical plane (horizontal seam) with a semiautomatic process using 350–400 amp d.c. current of reversed polarity, and welding arc voltage of 29–30 v.

The mixture of oxygen and carbon dioxide taken in the proportion (by weight) 0.3 to 0.7 was used as a shielding gas.

The steel in the test pieces 20 mm thick contained 0.18% of carbon, 0.45% of manganese, 0.20% of silicon, 0.020% of sulphur, 0.015 of phosphorus, the balance being iron.

The core flux composition used contained the following ingredients, in weight %:

TABLE 1

| | Flux-cored wire | |
|---|---|---|
| Core flux ingredients | A | B |
| rutile concentrate | 32 | 40 |
| fluorite concentrate | 4.6 | 8.5 |
| ferromanganese | 16.3 | 18.5 |
| ferrosilicon | 2.2 | 2.7 |
| nepheline concentrate | 4.0 | 7.0 |
| cryolite | 2.7 | 4.5 |
| iron powder | balance | balance |

Metal of the weld seams formed with the use of the flux-cored wires having a core made from the above flux composition was tested for notch impact strength, specific elongation, tensile strength, and was subjected to physicochemical analysis to determine gas content (oxygen, nitrogen, hydrogen) in the weld metal.

Mechanical tests were conducted by applying conventional methods.

Oxygen, nitrogen and residual hydrogen content was found by conventional vacuum melting methods, whereas the content of diffusive hydrogen was determined by the international standard ISO 3690.

The test results are given in Tables 1 and 2.

TABLE 2

| | Tensile strength | Specific elongation, | notch impact strength, kgm/cm$^2$ (Mesnager notch test) | | | |
|---|---|---|---|---|---|---|
| Flux-cored wire | kg/mm$^2$ | %% | +20°C. | −20° C. | −40° C. | −60° C. |
| A | 52–55 | 29–31 | 18–19 | 14–15 | 11–12 | 8–10 |
| B | 58–62 | 24–26 | 15–16 | 11–12 | 8–9 | 6– |

TABLE 3

| Flux-cored wire | Gas content, wgt % | | Hydrogen content, cm$^3$ per 100 g | | |
|---|---|---|---|---|---|
| | Oxygen | Nitrogen | diffusive | residual | total |
| A | 0.05 | 0.007 | 2.5 | 2.2 | 4.7 |
| B | 0.05 | 0.008 | 3.2 | 2.8 | 6.0 |

The flux-cored wires having a core formed from the flux composition of the invention provide for a proper formation of the weld seam.

EXAMPLE 4

Welding steel test pieces were effected with the use of 2.5 mm flux-cored wires (designated as A and B) having a core formed of the proposed flux composition of the invention. The steel sheath of each wire constituted 70% by weight of the electrode wire used and contained the following ingredients, wgt %: carbon—0.08, manganese—0.030, silicon—0.12, phosphorus 0.030, sulphur—0.030.

Forming the weld seams was carried out in a vertical plane (horizontal seam) with a semiautomatic process using 350-400 amp d.c. current of reversed polarity, and welding arc voltage of 29-30 v.

Carbon dioxide was used as a shielding gas.

The steel in the test pieces 20 mm thick contained 0.018% of carbon, 0.45% of manganese, 0.20% of silicon, 0.020% of sulphur, 0.015% of phosphorus, the balance being iron.

The core flux composition used contained the following ingredients, in weight %:

| | |
|---|---|
| rutile concentrate | 23 |
| fluorite concentrate | 0.8 |
| ferromanganese | 15.5 |
| ferrosilicon | 1.8 |
| nepheline concentrate | 1.0 |
| cryolite | 1.0 |
| iron powder | balance |

Metal of the weld seams formed with the use of the flux-cored wires having a core made from the above flux composition was tested for notch impact strength, specific elongation, tensile strength, and was subjected to physicochemical analysis to determine gas content (oxygen, nitrogen, hydrogen) in the weld metal.

Mechanical tests were conducted by applying conventional method.

Oxygen, nitrogen and residual hydrogen content was found by conventional vacuum melting methods, whereas the content of diffusive hydrogen was determined by the international standard ISO 3690.

The comparative results of mechanical tests and chemical analysis given in Tables 2 and 3 illustrate the advantages of the flux-cored wires having a core formed from the proposed flux composition over the prior art flux-cored wire (USSR Author's Certificate No. 285,801).

TABLE 3

| Flux-cored wire | Gas content, wgt % | | Hydrogen content, cm$^3$ per 100 g | | |
|---|---|---|---|---|---|
| | Oxygen | Nitrogen | diffusive | residual | total |
| of the invention | 0.08 | 0.007 | 2.8 | 2.2 | 5.0 |
| of the prior art (USSR Author's Cert. 285,801) | 0.08 | 0.012 | 4.0 | 4.0 | 8.0 |

As can be seen from Table 2 the weld metal resulting from welding with the use of a flux-cored wire of the invention features better mechanical properties than the metal of the weld produced by using the prior art wire (USSR Author's Certificate No. 285,801).

EXAMPLE 5 (negative)

Welding test pieces was carried out in the same manner as in Example 2 for except that the ingredients of the core flux composition were taken in amounts which were below the lower limits indicated in the attached claims. The flux-cored wire used was 2.5 mm in diameter and had a steel sheath constituting 70% by weight thereof and containing 0.08% of carbon, 0.23% of manganese, 0.09% of silicon, 0.010% of phosphorus, and 0.010% of sulphur.

Welding current was 400-450 amp, with the welding arc voltage being 30-32 v.

The above flux composition contained the following ingredients, by weight %:

| | |
|---|---|
| rutile concentrate | 18 |
| fluorite concentrate | 0.5 |
| ferromanganese | 13.0 |
| ferrosilicon | 1.4 |
| iron powder | balance |
| Given below are results of mechanical tests: | |
| Tensile strength, kg/mm$^2$ | 47-48 |
| specific elongation, % | 24-25 |
| notch impact strength (Mesnager notch test) kgm/cm$^2$ at | |
| +20° C. | 12-13 |
| −20° C. | 5-6 |
| −40° C. | 3-4 |
| −60° C. | — |

As follows from the above test results the weld seam produced by using the flux-cored wire with the above core flux composition showed low mechanical properties, especially low impact strength, and increased tendency to the formation of pores and cracks. In addition, the arc stability lowers, whereas intensity of weld metal spattering increases.

EXAMPLE 6 (negative)

Welding test pieces were carried out in the same manner as in Example 2 for except that the ingredients of the core flux composition were taken in amounts

TABLE 2

| Flux-cored wire | Tensile strength, kg/mm$^2$ | Specific elongation, wgt %% | Notch impact strength, kgm/cm$^2$ (Mesnager notch test) | | | |
|---|---|---|---|---|---|---|
| | | | +20° C. | −20° C. | −40° C. | −60° C. |
| of the invention | 52-54 | 26-28 | 17-18 | 13-14 | 11-12 | 10-11 |
| of the prior art (USSR Author's Cert. 285.801) | 42-46 | 18-22 | 11-12 | 6-7 | 2.5-8.0 | — | exceeding the upper limits indicated in the attached claims. The flux-cored wire used was 2.5 mm in diameter and had a steel sheath constituting 70% by weight thereof and containing 0.08% of carbon, 0.30% of manganese, 0.12% of silicon, 0.030% of phosphorus, and 0.030% of sulphur.

Welding current was 400–450 amp, with the welding arc voltage being 30–32 v.

The above flux composition contained the following ingredients, by weight %:

| | |
|---|---|
| rutile concentrate | 40.5 |
| fluorite concentrate | 8.6 |
| ferromanganese | 18.7 |
| ferrosilicon | 2.8 |
| nepheline concentrate | 7.5 |
| cryolite | 4.6 |
| iron powder | 17.3 |
| Given below are the results of mechanical tests: | |
| Tensile strength, kg/mm$^2$ | 65–70 |
| specific elongation, % | 19–20 |
| notch impact strength (Mesnager notch test) kgm/cm$^2$ at | |
| +20° C. | 10–12 |
| −20° C. | 4–5 |
| −40° C. | 2–4 |
| −60° C. | — |

As can be seen from the test results, the weld seam produced by using the flux-cored wire having the above core flux composition showed a higher hardness of the weld metal, lower plasticity and especially lower impact strength at low temperatures. In addition, the weld seam formation was also affected.

While the invention has been described herein in terms of the preferred embodiments, numerous variations may be made in the invention without departing from the spirit or the scope of the appended claims.

We claim:

1. Core flux composition of a flux-cored wire for welding and surfacing steels with a gas-shielded process, containing the core flux ingredients in the following amounts, by weight %:

| | |
|---|---|
| rutile concentrate | 20–40 |
| fluorite concentrate | 0.6–8.5 |
| ferromanganese | 13.5–18.5 |
| ferrosilicon | 1.6–2.7 |
| nepheline concentrate | 0.5–7 |
| cryolite | 0.6–4.5 |
| iron powder | balance |

2. The core flux composition of a claim 1, wherein the core flux composition is located within a steel sheath.

3. In a method of arc welding steel, wherein an electric arc is established between the steel to be welded and a flux-cored electrode wire, and wherein a shielding gas is passed around the arc, the improvement comprising the use of the composition of claim 1 as the core flux composition of the flux-cored electrode wire.

4. A flux-cored wire for welding, wherein the core flux composition of the wire comprises the core flux ingredients in the following amounts, by weight %:

| | |
|---|---|
| rutile concentrate | 20–40 |
| fluorite concentrate | 0.6–8.5 |
| ferromanganese | 13.5–18.5 |
| ferrosilicon | 1.6–2.7 |
| nepheline concentrate | 0.5–7 |
| cryolite | 0.6–4.5 |
| iron powder | balance. |

* * * * *